United States Patent
Dantzig et al.

(10) Patent No.: US 9,607,033 B2
(45) Date of Patent: *Mar. 28, 2017

(54) SUPPORTING LINKED MULTI-USER DECISION MAKING IN ENVIRONMENTS WITH CONSTRAINED SHARED RESOURCES UTILIZING DURABLE FILES

(75) Inventors: Paul M. Dantzig, Scarsdale, NY (US); Robert O. Dryfoos, Hopewell Junction, NY (US); Sastry S. Duri, Yorktown Heights, NY (US); Mark Gambino, Brewster, NY (US); Arun Iyengar, Yorktown Heights, NY (US); Francis Parr, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 514 days.

This patent is subject to a terminal disclaimer.

(21) Appl. No.: 13/115,531

(22) Filed: May 25, 2011

(65) Prior Publication Data

US 2012/0078963 A1   Mar. 29, 2012

Related U.S. Application Data

(63) Continuation of application No. 12/888,811, filed on Sep. 23, 2010.

(51) Int. Cl.
   *G06F 17/30* (2006.01)
(52) U.S. Cl.
   CPC .............................. *G06F 17/30362* (2013.01)
(58) Field of Classification Search
   None
   See application file for complete search history.

(56) References Cited

U.S. PATENT DOCUMENTS 5,193,162 A * 3/1993 Bordsen .............. G06F 11/1471
                                                                707/999.008
6,389,420 B1   5/2002 Vahalia et al.
(Continued)

FOREIGN PATENT DOCUMENTS

| EP | 1770954 A1 | 4/2007 |
| EP | 1914639 A1 | 4/2008 |
| WO | 0113202 A2 | 2/2001 |

OTHER PUBLICATIONS

Office Action dated Jun. 11, 2012 for U.S. Appl. No. 12/888,811.
(Continued)

*Primary Examiner* — Jensen Hu
(74) *Attorney, Agent, or Firm* — Fleit Gibbons Gutman Bongini Bianco PL; Jon A. Gibbons

(57) ABSTRACT

Embodiments of the present invention manage multiple requests to allocate real world resources in a multi-user environment. A set of resource availability information is stored in a first durable data file for each resource in a plurality of resources provided by a database environment. The database environment is shared between a plurality of users. A decision context is associated with a second durable data file. The decision context is associated with a user interacting with the database environment. The decision context exists for a defined duration of time. A least one resource is determined to have been temporarily allocated to the decision context for the defined duration of time. The second durable data file is updated to indicate that the at least one resource has been temporarily allocated to the decision context. The first durable data file is updated to indicate that the at least one resource is currently unavailable.

6 Claims, 8 Drawing Sheets

(56) References Cited

U.S. PATENT DOCUMENTS

| | | |
|---|---|---|
| 6,751,617 B1 | 6/2004 | Anfindsen |
| 7,016,857 B1 | 3/2006 | Lloyd et al. |
| 7,730,046 B2 | 6/2010 | Barth et al. |
| 2002/0099719 A1 | 7/2002 | Schwitters et al. |
| 2002/0107998 A1* | 8/2002 | Kim .................. G06F 9/52 719/316 |
| 2005/0138375 A1* | 6/2005 | Sadjadi ............ G06F 17/30362 713/167 |
| 2005/0192851 A1* | 9/2005 | Rangnekar ....................... 705/5 |
| 2005/1019285 | 9/2005 | Rangnekar |
| 2006/0206534 A1* | 9/2006 | Banks ............... G06F 17/30356 |
| 2007/0005599 A1* | 1/2007 | Klein ................ G06F 17/30362 |
| 2007/0055555 A1 | 3/2007 | Baggett et al. |
| 2007/0162449 A1 | 7/2007 | Manolov et al. |
| 2007/0162926 A1* | 7/2007 | Steelberg et al. ............... 725/34 |
| 2009/0006402 A1* | 1/2009 | Bohle ..................... G06F 9/526 |
| 2009/0063489 A1* | 3/2009 | Neumann ......... G06F 17/30356 |
| 2009/0106248 A1* | 4/2009 | Vaghani ............ G06F 17/30168 |
| 2011/0029882 A1* | 2/2011 | Jaisinghani ................... 715/736 |
| 2011/0093488 A1 | 4/2011 | Amacker et al. |

OTHER PUBLICATIONS

Final Office Action dated Nov. 2, 2012 for U.S. Appl. No. 12/888,811.

Office Action dated Jul. 31, 2014 for U.S. Appl. No. 12/888,811.

Shapiro, et al., "A Constraint-Based Formalism for Consistency in Replicated Systems," OPODIS 2004, LNCS 3544, pp. 331-345, Dec. 2004, ©Springer-Verlag Berlin Heidelberg.

Final Office Action dated Dec. 22, 2014, received for U.S. Appl. No. 12/888,811.

Non-Final Office Action dated Apr. 10, 2015, received for U.S. Appl. No. 12/888,811.

Non-Final Office Action dated Mar. 24, 2016, received for U.S. Appl. No. 12/888,811.

* cited by examiner

SUPPORTING LINKED MULTI-USER DECISION MAKING IN ENVIRONMENTS WITH CONSTRAINED SHARED RESOURCES UTILIZING DURABLE FILES

CROSS-REFERENCE TO RELATED APPLICATION

This patent application is a continuation of U.S. patent application Ser. No. 12/888,811, entitled "Supporting Linked Multi-User Decision Making In Environments With Constrained Shared Resources", filed on Sep. 23, 2010, the entire teachings of which being hereby incorporated by reference.

FIELD OF THE INVENTION

The present invention generally relates to managing data, and more particularly relates to managing database resources in a multi-user environment.

BACKGROUND OF THE INVENTION

Databases support the management of large collections of data with many user applications accessing the data. However, consider the problem of a community of users continuously making independent interacting decisions in a time sensitive way about their future actions. In this scenario the decisions of each user potentially affect the decisions and actions available to other users. User decisions can interact with each other because they are competing for a resource, e.g., competing for seats on a flight in an airline reservation system. User decisions can be time sensitive (associated with a time window) because, for example, in an environment such as an airlines reservation context a user can be allowed to "hold" a reservation on an initial flight leg while they are looking for a connecting flight. This "hold" is temporary and the held leg needs to be returned to the available pool within some business factor determined delay if a connection is not found. The transactions provided by existing database and transaction middleware are generally not able to perform time sensitive and compensating transaction logic operations required in these situations.

SUMMARY OF THE INVENTION

In one embodiment, a method for managing multiple requests to allocate real world resources in a multi-user environment is disclosed. The method comprises storing a set of resource availability information in a first durable data file for each resource in a plurality of resources provided by a database environment. The database environment is shared between a plurality of users. A decision context is associated with a second durable data file. The decision context is associated with a given user in the plurality of users interacting with the database environment and existing for a defined duration of time. A least one resource in the plurality of resources is determined to have been temporarily allocated to the decision context for the defined duration of time. The second durable file is updated to indicate that the at least one resource has been temporarily allocated to the decision context in response to the determining. The set of resource availability information in first durable file is updated to indicate that the at least one resource is currently unavailable.

In another embodiment, a system for managing multiple requests to allocate real world resources in a multi-user environment is disclosed. The system comprises a processor and a memory that is communicatively coupled to the processor. A decision base system is communicatively coupled to the processor and the memory. The decision base is configured to perform a method comprising storing a set of resource availability information in a first durable data file for each resource in a plurality of resources provided by a database environment. The database environment is shared between a plurality of users. A decision context is associated with a second durable data file. The decision context is associated with a given user in the plurality of users interacting with the database environment and existing for a defined duration of time. A least one resource in the plurality of resources is determined to have been temporarily allocated to the decision context for the defined duration of time. The second durable file is updated to indicate that the at least one resource has been temporarily allocated to the decision context in response to the determining. The set of resource availability information in first durable file is updated to indicate that the at least one resource is currently unavailable.

In yet another embodiment, a computer program product for managing multiple requests to allocate real world resources in a multi-user environment is disclosed. The computer program product comprises a storage medium readable by a processing circuit and storing instructions for execution by the processing circuit is configured to perform a method. The method comprises storing a set of resource availability information in a first durable data file for each resource in a plurality of resources provided by a database environment. The database environment is shared between a plurality of users. A decision context is associated with a second durable data file. The decision context is associated with a given user in the plurality of users interacting with the database environment and existing for a defined duration of time. A least one resource in the plurality of resources is determined to have been temporarily allocated to the decision context for the defined duration of time. The second durable file is updated to indicate that the at least one resource has been temporarily allocated to the decision context in response to the determining. The set of resource availability information in first durable file is updated to indicate that the at least one resource is currently unavailable.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Figure 1:
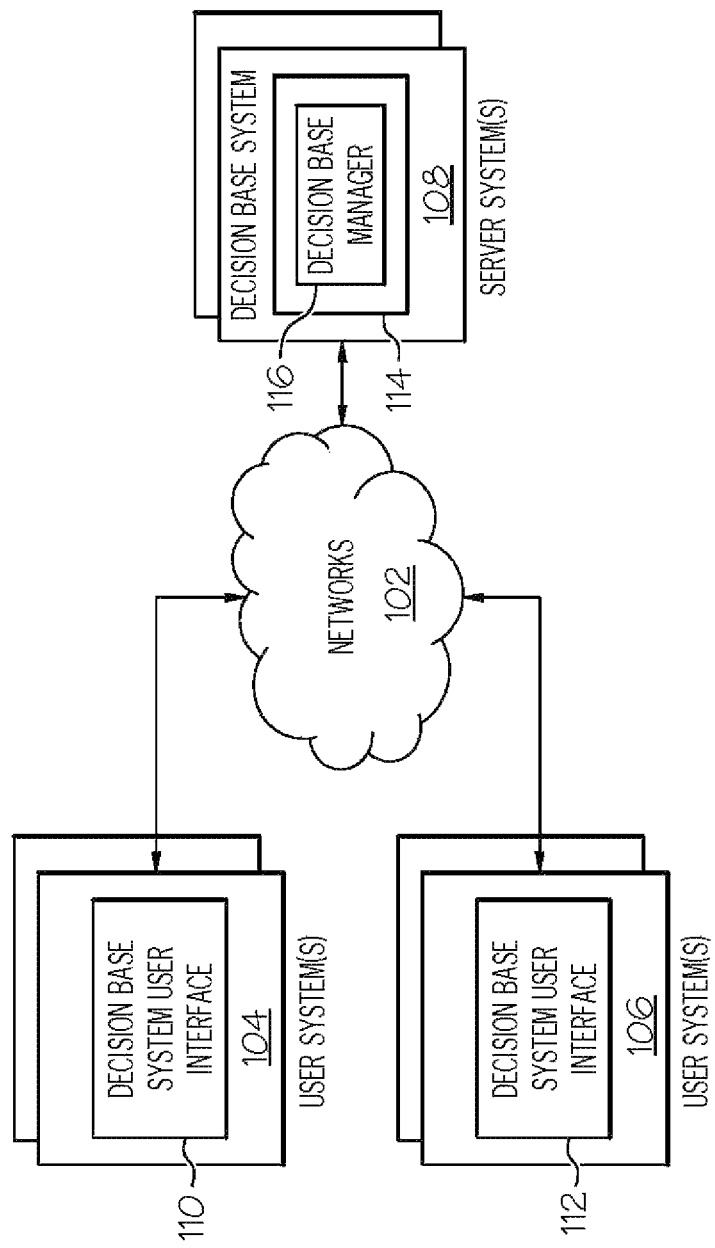
FIG. 1 is a block diagram illustrating one example of an operating environment according to one embodiment of the present invention.

According to one embodiment, FIG. 1 illustrates one example of an operating environment for a decision base system. In particular, FIG. 1 shows one or more networks 102 that, in one embodiment, are wide area networks, local area networks, wired networks, wireless networks, and/or the like. In one embodiment, one or more client information processing systems 104, 106 and one or more server systems 108 are communicatively coupled to the network(s) 102. The client information processing systems 104, 106 can comprise a decision base system user interface 110, 112 where a user can interact with a decision base system 114 residing at the one or more server system(s) 108, as is discussed in greater detail below.

The decision base system 114 is a scalable computer information system that provides multistep decision making and resolution of associated resource conflicts for a community of users. The decision base system 114 can be implemented within or communicatively coupled to various types of multi-user environments such as, but not limited to, travel reservation systems (e.g., airline, automotive, hotel, train reservation systems), credit card application processing systems, or the like. One example of a travel reservation system applicable to various embodiments of the present invention is given in the commonly owned U.S. patent application Ser. No. 12/644,875 entitled "Two-Layer Data Architecture For Reservation Management System", which is hereby incorporated by reference in its entirety.

Applications executing on the decision base System 114 and users interacting with these applications are provided decision integrity. Decision integrity is defined as follows: (1) each user can request the creation of decision contexts comprising: a set of specific action choices open to that decision maker; at least a portion of the "best information available" decision information at the start of the decision context on which to base the decision; and rules governing time and processing options available to the decision maker before the decision context is closed; (2) the user of the decision context is assured that the options presented at the opening of the decision context will all be available on closure of the decision context provided that decision time and processing constraints were met; (3) and that the decision information made available was the "best information available" at the start of the decision context.

The decision base system 114 also provides decision context scripting to allow for continuous user/provider specified cleanup of information integrity in the decision base. Unlike transaction management, decision integrity management has significant business content and itself requires business decisions (based on best available information). The decision base System 114, in one embodiment comprises a decision base Manager (DCBM) 116. The DCBM 116 can be combined with existing database and messaging services or products to create or enable construction of a decision base System 114. The DCBM 116 manages a collection of decision context instances supporting a decision making user community with decision integrity for all of the decision contexts. The DCBM 116 allows the creation of an application decision framework that defines the complete set of decision logic, business analytics, synchronization and data requirements of a particular decision making system. The decision base system 114, the DCBM 116, and their components are discussed in greater detail below.

Figure 2:
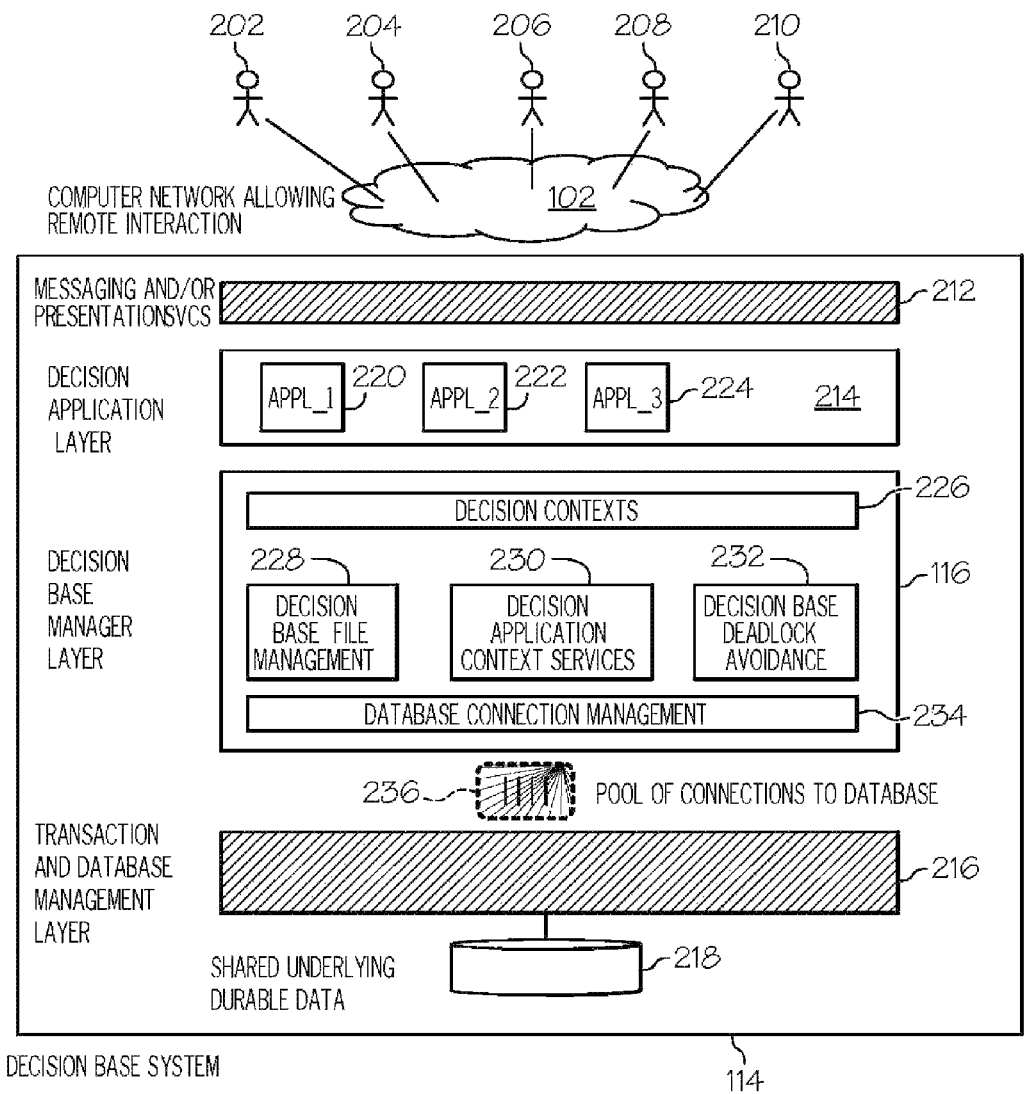
FIG. 2 is a block diagram illustrating a more detailed view of the operating environment of FIG. 1 according to one embodiment of the present invention.

FIG. 2 shows another view of the operating environment 100 and a more detailed view of the architecture and layering of the decision base System 114. FIG. 2 shows a plurality of decision base users 202, 204, 206, 208, 210 associated with the user systems 104, 106 in FIG. 1. As discussed above, these systems 104, 106 are communicatively coupled to the decision base system 114 via one or more networks 102. Each of these users gathers information from the shared underlying data and makes decisions that potentially affect the options available in the future to other users. These users interact with the decision base system 114 via the user interfaces 110, 112. In an alternate embodiment one or more of these users can also be connected locally and directly to the decision base system 114.

The decision base system 114, in one embodiment, comprises various layers such as a Messaging and Presentation Services layer 212, a decision application layer 214, the decision base Manager layer 116, a Transaction and Database Management layer 216, and Shared Underlying Durable Data shown as a disk symbol 218. The Messaging and Presentation Services layer 212 provides networking and browser or terminal support enabling user connectivity and visual interfacing. The decision application layer 214 hosts decision application instances. In FIG. 2 three application instances 220, 222, 224 are shown for illustration purposes only. However, one or more additional concurrent application instances can be hosted as well. Each decision application instance 220, 222, 224 manages a user decision dialogue with processing for a user interaction. Decision applications 220, 222, 224 use decision contexts 226 supported by the decision base manager 116 as part of their programming model. Principle functions of the decision base manager layer 116 are: support for decision contexts 226, decision base file management 228, decision application context services 230, decision base deadlock avoidance 232, and database connection management 234.

Decision contexts 226 are a service provided by the DCBM 116 for decision applications 220, 222, 224. A decision context 226 provides a decision application 220, 222, 224 (and indirectly a decision base user 202 supported by that decision application 220) with information and a set of action choices with the assurance that these action choices are to remain available for the lifetime of the decision context 220. In many cases a choice of action is made available by pre-allocating real world resources enabling that action for the use of that specific decision context 220.

The decision base file manager 228 is responsible for providing access to file collections of durably stored records. This access is provided with the option to choose for each file access whether records retrieved for update are to be held locked in the underlying database of durable data or updated using an optimistic locking scheme. Decision application context services 230 support the deployment and registration of decision application processes or threads so as to enable their use of the decision base Manager functions.

The decision base deadlock avoidance function 232 ensures that only safe patterns of durable file access are allowed avoiding the need for detection and breaking of deadlocks by forced transaction aborts. It is important to avoid deadlocks in a decision base system 114. The decision base file manager 228 can prevent deadlocks on durable file data access by enforcing deadlock free access ordering. A conventional technique to avoid deadlocks in conventional resource locking schemes is to enforce an ordering on resources locked at access block open time. The conventional algorithm uses the assumption that locks will be held until the ACID transaction requesting them ends. In the decision base system 114 locks are released independently on each durable file accessed by a decision application. File Access Blocks (FABs) are used to define the context where a decision application is accessing a durable file and possibly holding a lock. Hence deadlock avoidance in a decision base can be provided by maintaining a stack of nested FAB contexts for each executing decision application and ensuring that inner FABs only lock files which are later in the resource ordering scheme than any of the current locks held by that decision application.

Database connection management 234 handles the pool of database connections allowing the decision base Manager layer 116 to interact with the underlying database and transaction management layer 216. Element 216 is a representation of this pool of database connections.

In the decision application layer 214 multiple decision application instances 220, 222, 224 supporting independent users are typically executing concurrently. Each decision application instance 220, 222, 224 manipulates decision contexts, which in turn causes concurrent updates to be made to the underlying shared durable data 218. The transaction and Database management layer 216 provides appropriate locking, transaction, logging, and isolation methods are in place to ensure that integrity is preserved in the underlying persistent and durable shared data at all times. Disk symbol(s) 218 represents the underlying shared data stored in some persistent storage mechanism such as magnetic disk.

It should be noted that the elements representing the messaging and presentation layer 212 and the database and transaction management layer 216 are shown as opaque with a line pattern. This reflects that technologies and existing commercially available software capabilities can be used for these functional layers.

Figure 3:
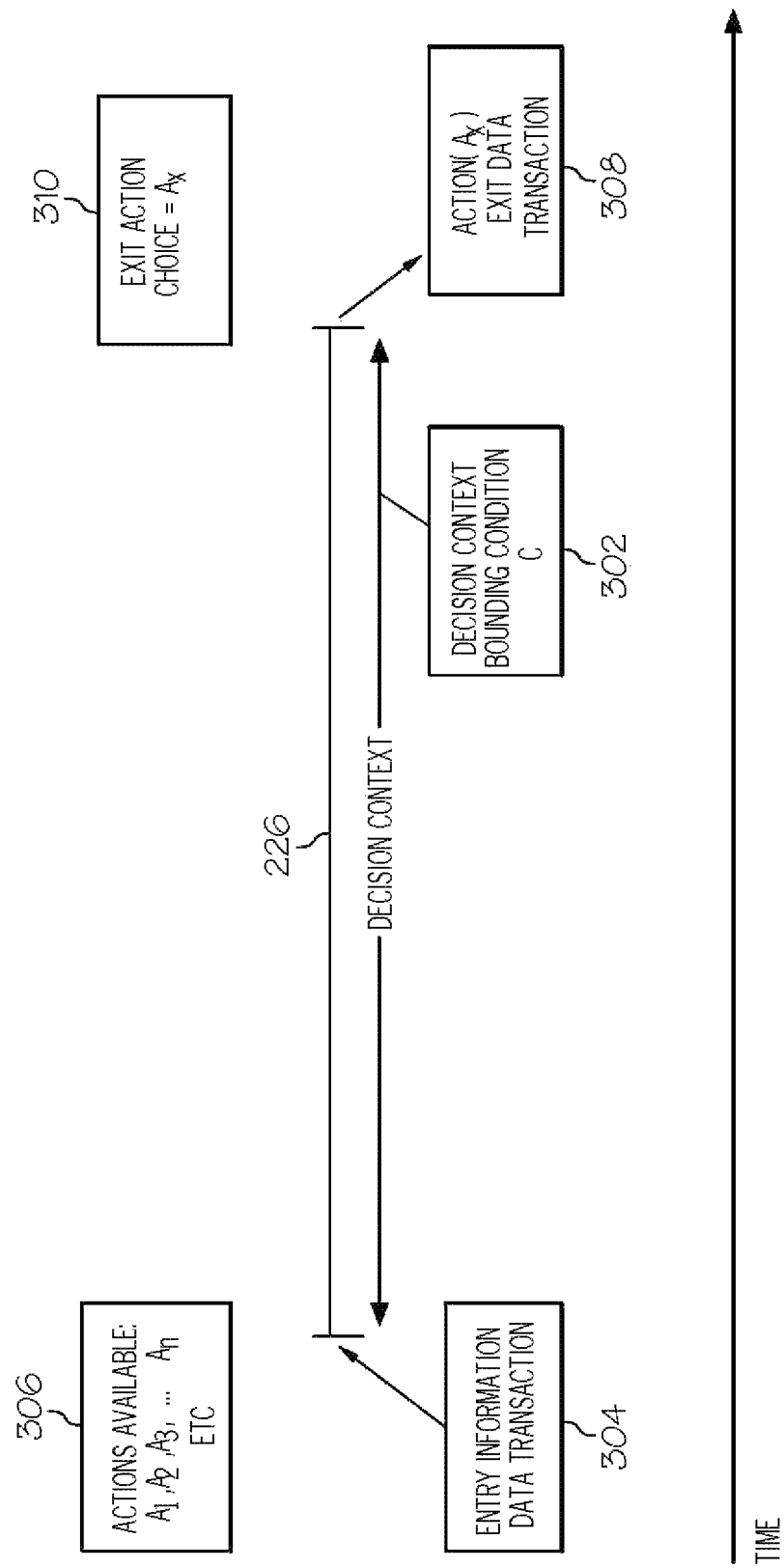
FIG. 3 illustrates an overview of a decision context according to one embodiment of the present invention.

Turning now to FIG. 3, FIG. 3 illustrates an overview of a decision context 226. A decision context 226 is a defined duration of time for which a defined set of actions are made available to the "holder" of the decision context. The context holder is free to gather additional information, typically by exploring contingent options, applying analytics or some decision making process. At the end of the decision context, the context holder chooses one of the available actions identified at the start of the context. Conditions 302 for bounding when a decision context ends can include (1) a time bounded decision context which stays open for a fixed predetermined interval of time; (2) an event bounded decision context which stays open until some specified event occurs; and (3) contexts with compound bounding rules combining the rules above; specified combinations of time and event conditions determine when the context ends.

In one embodiment where a community of users is sharing and updating a collection of data to reflect their independently made decisions, the creation and completion of decision contexts 226 is recorded durably using short lived data update transactions to record these state changes in the persistent data of the decision base system 114. The entry information data transaction 304 is used to gather information useful to the decision context holder, to record the start of the decision context, and to record any resource reservations associated with this decision context needed to keep actions 306 $A_1, A_2, A_3, \ldots A_n$ available to the user of this context. These available actions 306 are available to the decision context user for the duration of the context 226. The exit data transaction 308 is used to update underlying shared persistent state information to reflect that the decision context has ended and that the chosen action is $A_x$ 310. The exit data transaction 308 is also used to permanently reserve the resources needed for action $A_x$ on behalf of this user and resources associated with other action choices are de-allocated/released. The de-allocated/released resources return to a state where they are available to reservation requests from other decision contexts and their associated users.

Figure 4:
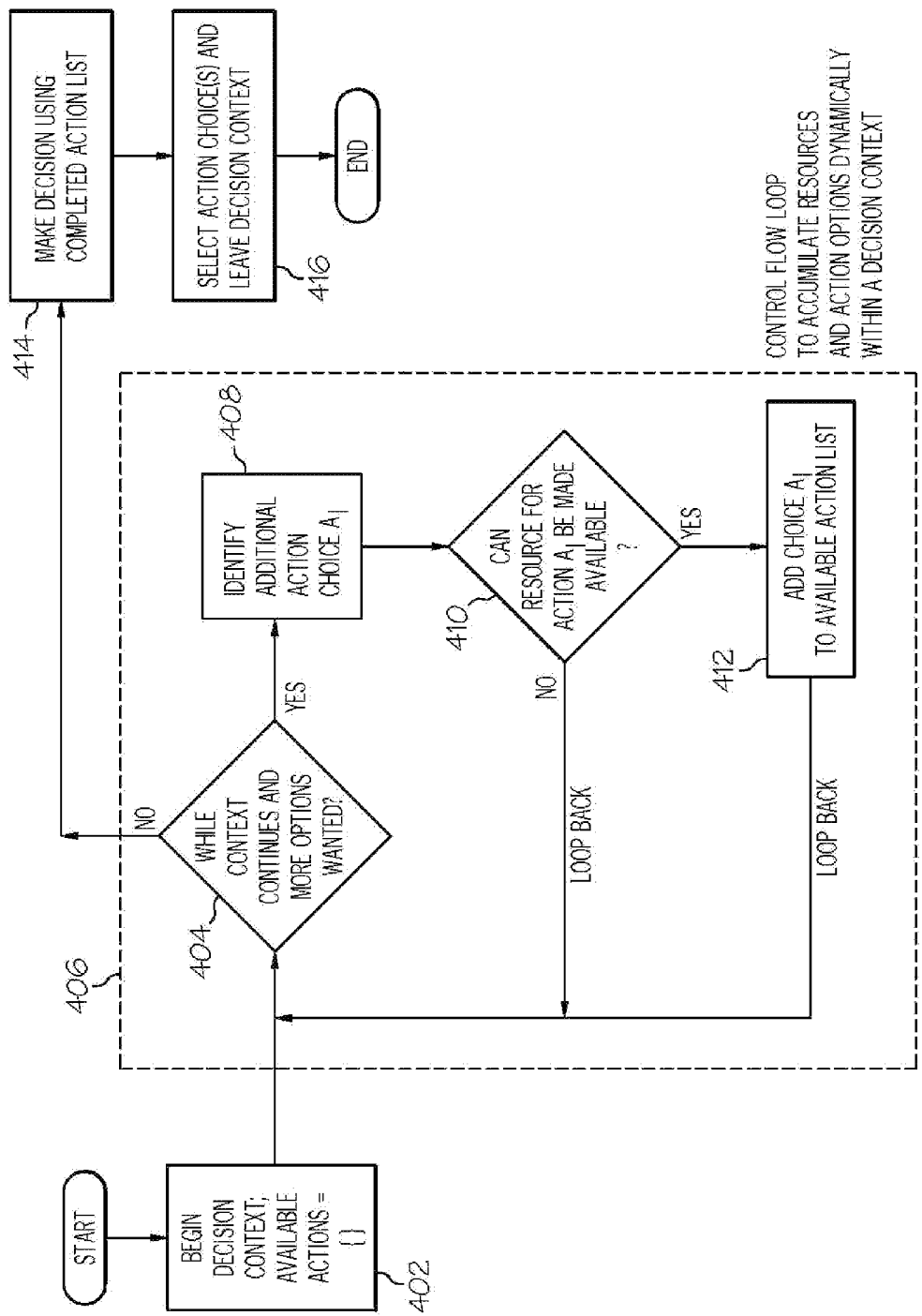
FIG. 4 is an operational flow diagram illustrating one process for dynamically generating a decision context according to one embodiment of the present invention.

In one embodiment, decision contexts 226 can be created dynamically. In this form, this list of allowable actions is not determined at context entry, but is established dynamically over the life of the decision context 226. This variation of decision context is illustrated by the operational flow of FIG. 4. One or more embodiments of a decision context can build up their available action list one action at a time and, hence, are effectively dynamic decision contexts.

The decision context 226, at step 402, is first created. In a dynamic decision context the list of available actions to choose from is initially set to be empty. Control then flows to decision element 404, which governs the main loop of the decision context. The dashed line element 406 identifies the area of iterated control flow corresponding to this loop. Each iteration of the loop 406 adds an additional option into the list of available actions associated with the decision context.

Decision box 404 tests whether exploration of additional action choices is needed and whether the bounding conditions of the decision context allow this. If both of these conditions are true then control flows to block 408 where an additional candidate action choice $A_i$ is identified. The next block 410 is a decision element in which an attempt is made to reserve all resources required to ensure that action $A_i$ is available. If this fails then the control flow returns to decision box 404 and a new iteration of the loop 406 starts. If the necessary resources are obtained, control flows to block 412 and the new action $A_i$ is added into the available list. Eventually, the list of available actions becomes sufficient or the end condition of the decision context requires exit through the loop termination and control flows to block 414. At this point, regular decision context semantics apply. A choice is made to select one (or more if allowed) of the available action options. Control flows to block 416 where the selected action is taken and durably recorded. The decision context 226 is ended and other unused resources can be returned to a state where they are once more available to others. The control flow then exits.

Atomic, consistent, isolated, durable (ACID) transactions can also be used within the decision base system 114. An ACID transaction ensures that a transaction, which is a collection of related data updates and messaging on behalf of one user, can have its results applied to shared data in such a way that all or none of the actions are applied. Many such transactions can be in progress concurrently, but each one sees a consistent view of the data not affected by uncommitted updates from others. Each transaction holds locks on the data it expects to update so this it has a private copy until the transaction ends. Transactions that end successfully (commit), write their results to durable storage so that they are not lost even in the event of a processing system failure.

Decision contexts 226 are implemented in a level above the level of the shared data or database system where ACID transactions are used to preserve data integrity. A decision context 226 gives the context holder an assurance that the list of specified available actions will remain available for selection at context end. The termination condition 302 of the decision context 226 specifies how long this freedom of choice is protected. ACID data transactions are typically generated to process the beginning and end of a decision context 226. Entry and exit transactions 304, 308 shown in FIG. 3 are examples of this demarcation. However, the defining property of a decision context 226 is the set of actions that are kept available for the user in the interval between these two generated transactions. The distinction (and different roles) of decision contexts 226 and ACID data transactions were further clarified in the architectural layering diagram of FIG. 2 showing how these technologies have roles and are used in the distinct functional layers 116, 216 within the decision base system 114.

The following is a more detailed discussion on the decision base system 114 and decision contexts 226. In one embodiment, decision contexts 226 are implemented by providing support in a concurrent information processing environment for a decision application to reliably move data representing allocations of real world resources between different durable data files with independent lock holding times in each of the durable files being modified. Nested data access scopes with optimistic and pessimistic locking options are used as a programming construct to enable decision application instances 220, 222, 224 to reliably update durable data records representing different allocation states of real world resources with appropriately selected lock holding times for each durable data collection access. A connection (or row access) manager provides the implementation mapping scoped data access requests onto connections to the underlying database holding the persistent data. Databases typically require that each ACID transaction communicated to the database to effect an update to its durable data must flow across a single database connection held on behalf of the requesting application instance for the life of the ACID transaction.

These embodiments are motivated by the requirement of a dynamic decision context that it be simple to develop software that "moves" resources needed for a particular action choice from a state where the resources are generally available to contending requests from many users, to an alternate state where they are temporarily, but durably, reserved to be available to a single decision context and hence to a particular user. This is performed by having the decision application instances 220, 222, 224 update the durable data in the shared database with independent actions to remove resources from files representing collections of generally available resources and insert the resources into different files of the shared database 218 recording resources reserved temporarily but durably for a particular decision context or durably and permanently for a particular user. Durable saving the state of a decision context 226 and the associated collection of resources reserved for its user is a step in this durable recording of resource allocations.

The database interactions that remove resources from a generally available list use some form of exclusive locking to manage data integrity of the list structures in a concurrent programming environment. The lock hold times for available resource lists are to be very short to minimize waiting time for other users. Locks are also used (in a concurrent programming environment) to ensure data integrity of access to the persistent state data associated with a decision context 226.

However a decision context 226 has a significant lifespan (to allow time for choice exploration and analysis) and is exclusively reserved for a user. Therefore, a single decision context application program 220 is able to access the underlying shared database at different times with short lock hold interactions to obtain contended for resources and with longer lock hold interactions to update durable decision context state. This allows for durable decision context state structures to be safely manipulated. This necessitates the fact that a decision context application program 220 is to have multiple access scopes to access different structures within the shared durable database 218 where the different scopes allow use of locking with significantly different lock hold times. Therefore, one or more embodiments provide a pattern of nested data access scopes.

Decision contexts 226 or a decision context programming model in middleware, are implemented, in one or more embodiments, with a mechanism for application programming logic executing in a concurrent information processing system. This allows information representing available real world resources to be moved between different durable files safely, reliably, and with minimal locking of shared durable data. The different durable files record different allocation dispositions of the represented real world resource.

Safe and reliable movement of the data records equates to assurances that: (1) the same resource is never transferred to multiple decision contexts 226 (representing duplicate allocations of the same real world resource to making it available to potentially competing users); (2) the likelihood of a resource record being lost as a result of information processing system failure is extremely low (null or very small time window of failure in transferring the durable resource record); and (3) there is enough locking of shared durable data records to avoid any possibility of overwrite of one applications thread's updates by another. Minimal locking of shared durable data corresponds to the following: when moving information representing available resources from durable file $F_1$ to durable file $F_2$, the lock hold times and lock options for the records being updated in $F_1$ and $F_2$ can be specified independently.

Figure 5:
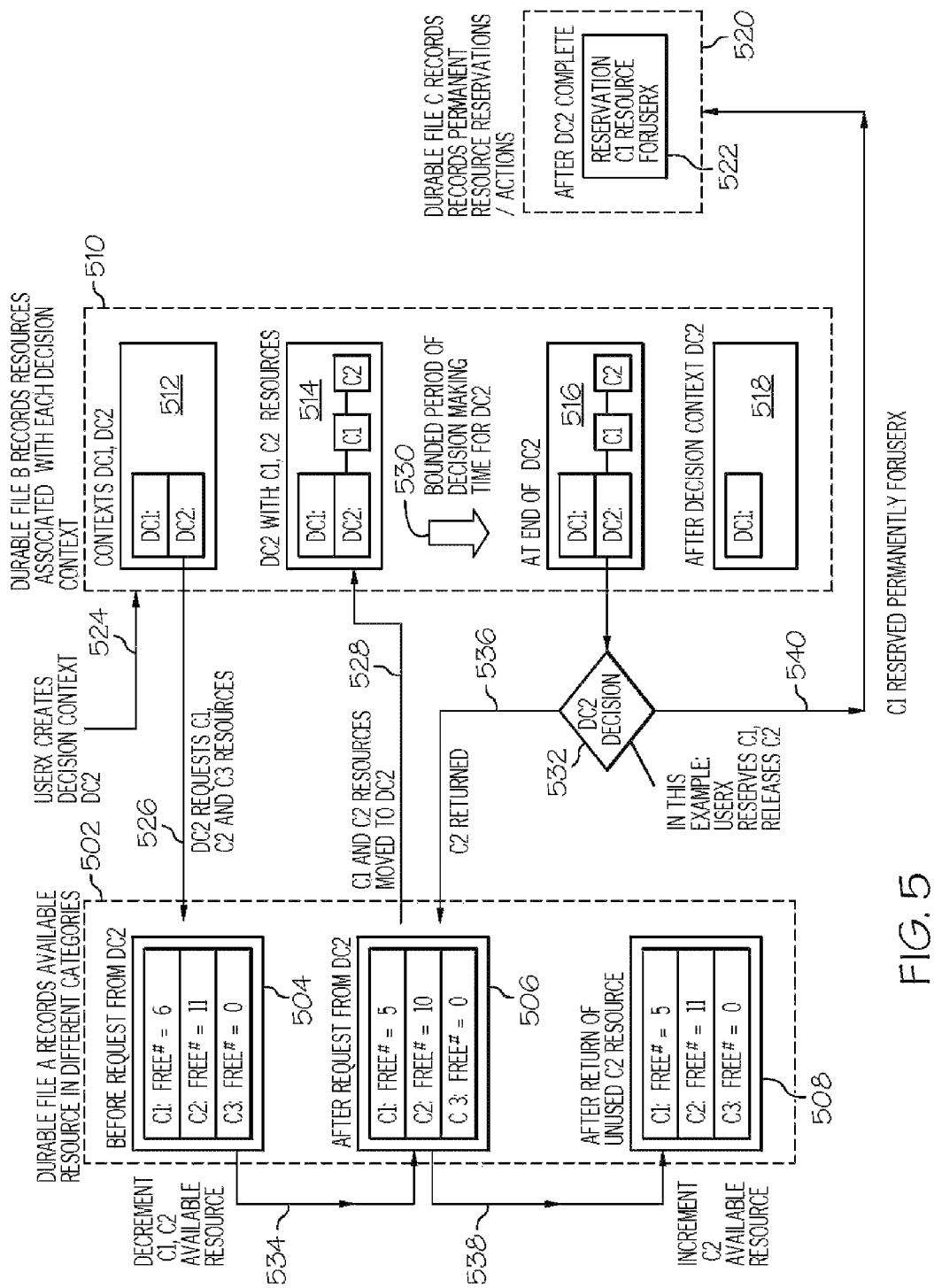
FIG. 5 is a sequencing diagram for resource disposition using separate durable files according to one embodiment of the present invention.

One example of a pattern of information movement and the required pattern of durable data updates in a decision context implementation is shown in FIG. 5. In FIG. 5, block 502 represents a durable file, File_A, with records showing the amount of resources available for many different categories of resources. Multiple snapshots of the state of this file at different points in time are shown. For example, block 504 represents the initial state of the file before interacting with any decision contexts. Block 506 represents the state of the file after handling a request from decision context DC2. Block 508 represents its state after unused resource has been returned from decision context DC2.

In a decision base system that manages, for example, flight reservations, each record in File_A can store the number of seats available for reservation in each of the classes of a given flight (on a given day). Block 510 shows a separate durable file, File_B. Each record in this file records the current state of a decision context 226 and whether any resources have been temporarily allocated to this decision context 226. Multiple snapshots of the state of this file at different points in time are shown. For example, block 512 shows an initial state with decision contexts DC1 and DC2 created, but without any resources assigned to them. Block 514 shows a subsequent state with resources, specifically a C1 resource and a C2 resources temporarily assigned to decision context DC2. Block 516 shows the file at a later point in time still with attached resources and decision context DC2 about to be completed. Block 518 shows the state after DC2 is ended. Block 520 shows a third file, File_C, used to record actions or resource reservations that are permanent and exist outside any decision context 226. A single state of this file is shown in block 522 with a permanent reservation of a C1 resource to a user, user_X, who had used decision context DC2 to explore alternatives and to decide on this action.

A more detailed discussion is now given with respect to a sequence of actions and events that lead to the above sequence of durable file states. The flow enters at element 524 where a decision base system user, User_X is given access to decision context DC2 or this decision context is created for User_X to use. DC2 is represented in the initial state 512 of File_B and does not have any resources associated with it at this time. A second decision context DC1 also exists in block 512. It should be noted that, in principle, multiple decision contexts are active and changing states concurrently, requiring locking when durable files are updated. In the sequence diagram of FIG. 5 only events that relate to the single decision context DC2 are shown for simplicity.

Decision context DC2, at event 526, makes a request to obtain a category C1 resource, a category C2 resource, and a category C3 resource, if these resources are available. The requests drive reading and updating of resource availability information in File_A. If decision context DC2 was static as discussed above with respect to FIG. 3, its associated resource requests, as shown in event 526, occur as part of the setup of decision context DC2. In the more general case of dynamic decision contexts, as discussed above with respect to FIG. 3, these resource requests can happen subsequently and the requests for the C1, C2, and C3 resources can be separate events occurring at different times.

The initial state of the resource file, File_A, before request for resources, at 526, arrives is shown in block 504. Records are maintained, in block 504, regarding how many resources are available in three different categories. In this example, it is shown that 5 resources are available in category C1, 10 resources are available in category C2, and 0 resources are available in category C3. A general File_A can record resource availability for an arbitrary number of categories and category structures. The availability recorded by records in File_A is the availability of the decision base system 114 to respond positively to subsequent requests for resource in that category from decision contexts 226. When the particular request 526 arrives, the requests for C1 and C2 resource can be satisfied, however, a C3 resource is currently not available.

The updating of File_A is shown as event 534. Availabilities of C1 and C2 resource as recorded in File_A are decremented. The subsequent state of File_A is shown in block 506. In this state for the example event sequence, the availabilities of the C1 and C2 resources are reduced to 5 and 10, respectively. There is no change in availability of C3 resource since this request could not be satisfied. Note that a clear property of this resource management is that an unequivocal answer is given in response to each resource request using durable File_A. After this updating of File_A, event 528 effectively transfers the assigned C1 and C2 resources from where they were available to requests from any user, to a state where they are assigned to the specific decision context DC2 associated with User_X.

Block 514 shows the updated state of File_B after event 528 is processed. Decision context DC2 now has C1 and C2 resources (one resource from each category) associated with it. Element 530 represents the fact that a significant flow of time can occur while User_X explores additional contingent alternatives and makes a decision as to which of the available action options to take on exiting from decision context DC2. The length of this duration/period of time is bounded by the rules associated with the decision context 226. Block 516 shows the snapshot of File_B just before DC2 ends. Essentially it has not changed, decision context DC2 still exists and still has a C1 and a C2 resource allocated to it.

Decision box 532 represents the final decision made by the user at the end of decision context DC1. For this example, User_X decides on an action to permanently reserve the available C1 resource and de-allocate/release the C2 resource to be available to others. The return of C2 resource is reflected in event 536. This results in an update of the state of File_A changing its state from that shown in block 506.

As previously noted, there could have been many other changes in File_A effected by other concurrently executing decision contexts, but only the changes driven by DC2 were shown in this example for simplicity. Event 538 shows the incrementing of available C2 resource in File_A. This results in the updated state of File_A after unused C2 resource is returned, as shown in block 508, with category C2 resource availability now returned to a value of 11.

Event 540 shows the transfer of the C1 resource to File_C where it becomes part of a durable record permanently reserving the C1 resource for the use of User_X, as shown in block 522. Block 518 shows a final state of File_B with decision context DC2 removed and no resources associated with it. It should be noted that the in alternate embodiments decision contexts 226 can be retained and become available for use by another user after they are completed.

The following is a more detailed discussion on the durable file structure and nested data access scopes. One advantage of the decision base system 114, as discussed above with respect to FIG. 5, is that safe update of durable file records using some form of logical record locking is made available to decision applications. Multiple decision contexts 226 and decision application instances 220, 222, 224 can be executing concurrently each making independent modifications to durable files. The decision base system 114 can be executing on a multiprocessor, cluster, or cloud processing platform.

The decision base system 114 preserves accurate information on decisions made and resource availabilities in the face of arbitrary thread scheduling and in the presence of system and platform component failures.

Different durable files, e.g., collections of durable records, in the decision base system 114 can have widely differing (1) levels of inter-application instance contention to read and update individual records and (2) expectations of reasonable logical lock hold times for which a single decision application instance can expect to retain exclusive ownership of a record for update.

The decision base file manager 228 addresses these needs by allowing decision applications to request durable file access services using a File Access Block (FAB). The File access Block allows the requesting application to specify a required durable record or set of records to be accessed and appropriate associated durable record locking. A single decision application instance 220 can have access to multiple durable files at the same time by opening several overlapping File Access Blocks. In one embodiment any decision application that is opening overlapped File Access Blocks does so in a nested way for providing clarity of application programming structure and to enable efficient stack oriented implementations of the file access service.

A distinguishing property of File Access Blocks of one or more embodiments of the present invention is that when control exits from a File Access Blocks, record locks associated with that block are immediately released. This is in contrast to the use of ACID transaction models where update locks acquired by a transaction must be retained until the entire transaction commits so that rollback of a transaction (removing the effect of any update operations by that transaction from durable data) is possible at any time until the transactions commits. In one embodiment, the decision base system 114 is configured so that the underlying database layer 216 shown in FIG. 2 uses fine grained ACID transactions with very short lives to ensure durable data consistency across the processing platform. The decision base file manager 228 makes higher level record locking with a broader range of permissible lock modes and lock hold times as needed for decision contexts available to decision applications 220, 222, 224 through File Access Blocks.

Figure 6:
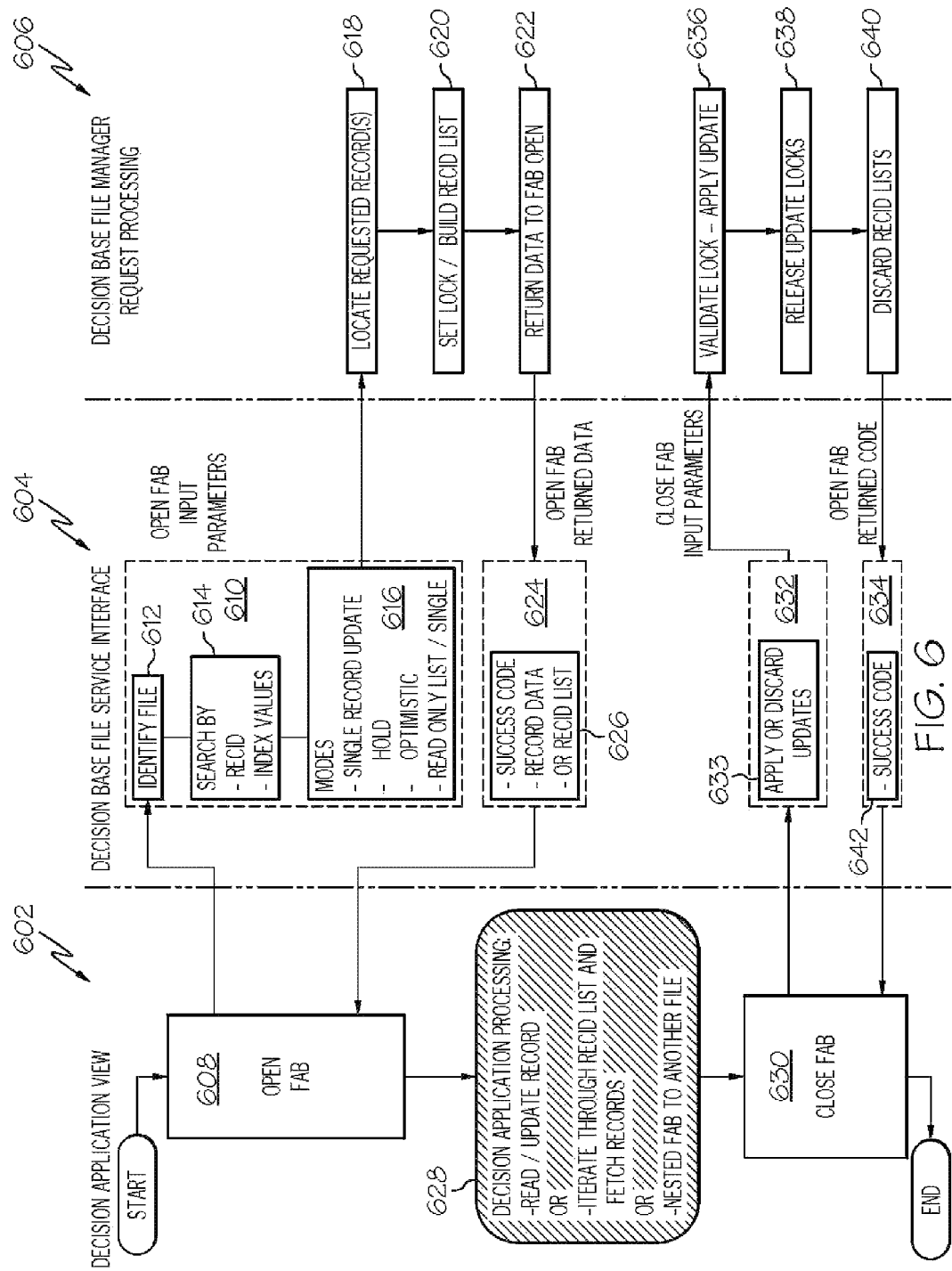
FIG. 6 is an operational flow diagram with respect to a file access block for durable file access and lock mode selection according to one embodiment of the present invention.

The general form and function of a File Access Block is shown in FIG. 6. FIG. 6 is organized into three columns 602, 604, 606. In the left most column 602 labeled "Decision Application View" it is shown how a decision application uses File Access Blocks to access durable file records. In the middle column 604 labeled "Decision Base File Service Interface", parameters passed with input and return information on each File Access Block operation are defined. The right most column 606 labeled "Decision Base File Manager Request Processing" shows high level processing steps in implementation of the File Access Block operations by the decision base file manager 228.

The processing flow of this diagram begins with the START symbol and flows to decision box 608 where the decision application opens a File Access Block to access durable data. The input parameters of the Open File Access Block operation are shown in dashed box 610. These include a specification of which file is to be accessed (block 612) and a search specification (block 614) indicating which records are to be retrieved. A unique record may be identified by its Record ID or key within the file. Alternatively, some search specification using an indexing structure on the file can be used to identify one or more records with particular field content. Finally, in block 616, a mode for the File Access Block is specified. A few examples of File Access Block modes that are supported by the decision base file manager 228 are (1) update a single record with an exclusive lock; (2) update a single record with an optimistic lock, which includes verifying that between reading and writing back an updated value, no other concurrent thread has modified the durable record value; and (3) read access only to one or more records of the file.

The decision base file manager 228 processes the open File Access Block by locating the identified durable file and the requested records in that file, represented by block 618. Techniques such as BTree indexing or hash indexing can be used to locate records of interest. These indexing structures are also managed by the decision base file manager 228 in association with each durable file. Block 620 represents a processing step where the decision base file manager 228 obtains appropriate locks in the case of an update File Access Block and builds a list of record identifiers (recIds) when retrieving locators for a set of read only records in the durable file matching search criterion. The details of this processing step in the decision base file manager are discussed in greater detail below with respect to FIG. 7. At block 622 the resulting data is packaged for return to the decision application opening the File Access Block.

The information returned to the decision application 220 on return from an open File Access Block is shown in block 624. The specific data items are shown in block 626. A success code indicates whether the Open FAB operation returned results in the expected form. A possible failure case is that no record satisfying the specified criteria was found. If the File Access Block was opened successfully, then the returned data can comprise a single record that is available for update by the decision application, a single record for read access only, and/or a list of record identifiers (record IDs) locating records matching the search criterion. When read access is sufficient and it is known that at most one record can be returned the readable record data is returned directly to the application.

Shaded block 628 summarizes the different types of action and processing logic that the decision algorithm can perform inside the File Access Block body. The decision algorithm can read, process, and update the fields of a durable file record retrieved for update. The decision algorithm can iterate through a list of record IDs of durable records matching the FAB search criteria and retrieved for read access only. Existing algorithms and interfaces for this form of iteration through a list can be used. The decision algorithm can also open a nested File Access Block to the same or another durable file within the body of this File Access Block. A important special case is that while searching through a list of records in read only mode for one File Access Block, the decision algorithm can locate a record of interest and open an inner File Access Block in an update mode to update that durable record.

Block 630 shows the decision application 220 closing the File Access Block body with a close File Access block request. The input parameters of this operation are summarized in dashed box 632 and the output information returned to the decision application on completion of the operation summarized in dashed box 634. The decision base file manager 228 is already aware of the File Access Block created as a context to provide service for this decision application. This results in the durable file, block mode, and record IDs of durable records visible to the decision application being already known to the decision base file manager 228 when the Close FAB operation is requested. The additional input parameter to be supplied by the application 220 is whether to apply or discard any updates it has made locally to a durable record held for update, as shown in block 633.

Processing of the close File Access Block operation by the decision base file manager 228 is shown at a conceptual level in blocks 636, 638, 640. A more complete and detailed discussion of this algorithm is provided with respect to FIG. 7 below. Block 636 is a check that valid locks are in place to ensure that the decision application's updates can be safely applied to the durable file record and applies the update. Block 638 shows that any held locks on the durable file for this FAB context released. Block 640 shows that any additional local data, particularly lists of record identifiers for matching read only records, retained to support this FAB Context are released. Block 642 shows that a success code is returned to the decision application 220 as a return parameter.

A possible cause for failure of a close FAB operation is that an optimistic lock has failed and that the requested update cannot be applied. This returned data is made available to the decision application on completion of a close FAB. This is represented by the control flowing out of block 630 to the END symbol since this File Access Block is complete. The decision application 220 can go on to open other File Access Block(s) or perform other processing.

Variations of the File Access Block discussed above can be used to insert new durable records into a durable file and for deleting records. These have modes very similar to those discussed above for a single record update except that some additional updating of indexing structures not directly visible to the decision application 220 may also be required.

Important characteristics of the durable file access method discussed above making it suitable to implement decision contexts 226 in a decision base resource allocation system are that (1) a decision application 220 can have multiple durable files open concurrently using nested FABs; (2) the method can independently select a mode for each durable file access, matching whether there is high contention for that durable file or not and whether it needs to be "update" or "read access only"; and (3) the method can release locks independently for each durable file access without waiting for other outer FAB block durable data accesses to complete. This enables a decision application 220 to access durable data files reliably while adapting its use to a wide range of levels of contention for different data files and corresponding expected shared logical lock lifetimes for different data files.

Figure 7:
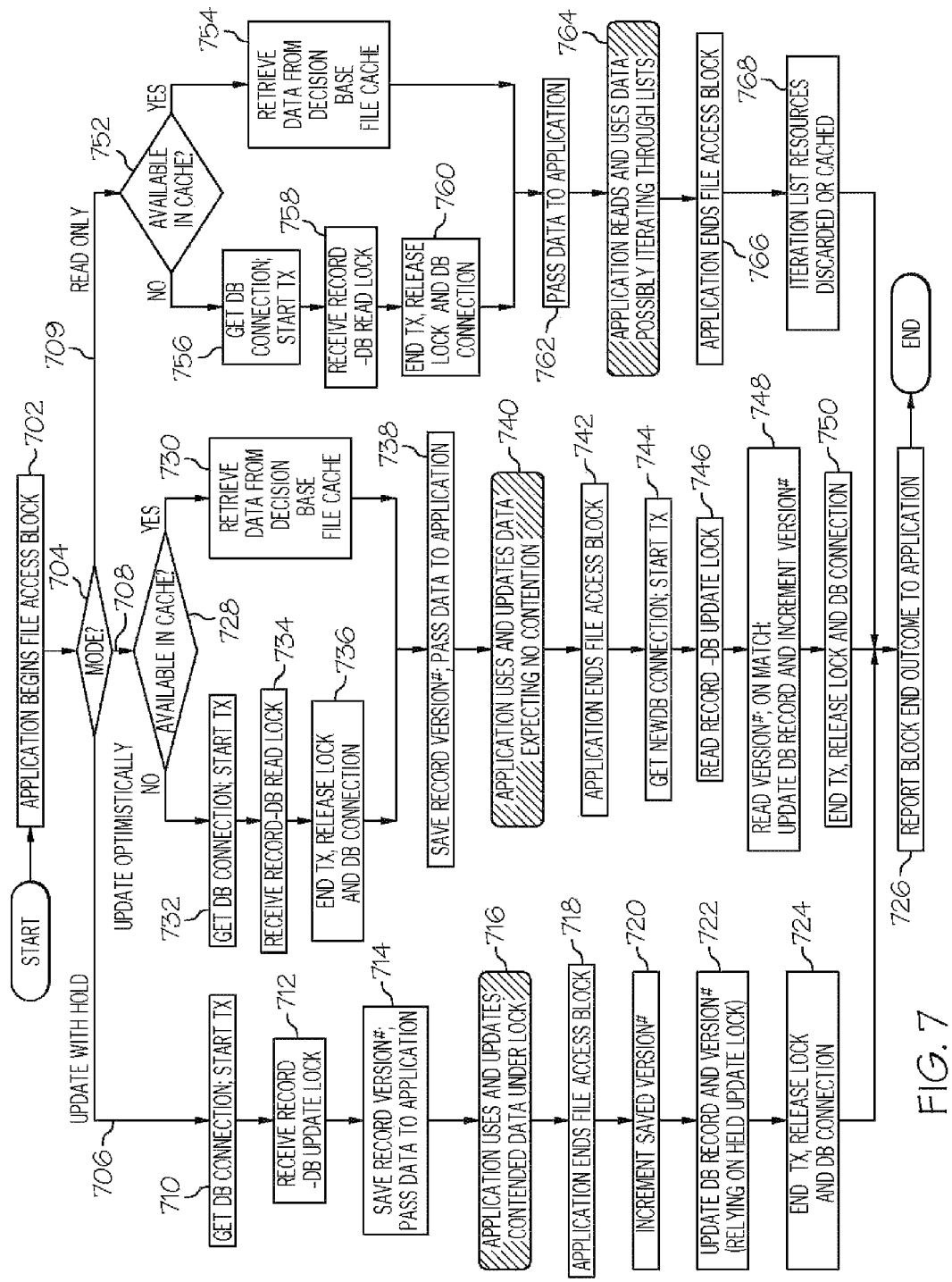
FIG. 7 is an operational flow showing one example of processing file access blocks according to one embodiment of the present invention.

One example of an algorithm for processing File Access Blocks by the decision base file manager 228 is shown in FIG. 7. This operational flow diagram shows the processing to support a File Access Block request from the perspective of the decision base file manager 228. A general decision base file manager 228 is organized to support multiple overlapped File Access Blocks requested from multiple decision applications executing concurrently.

The control flows from the START symbol to block 702 where a request to open a FAB is received. Decision block 704 selects a processing path appropriate to the mode of the FAB: path 706 is the path for update with hold, path 708 is the path for update optimistic, and path 709 is the path for read only mode FABs. With respect to the update with hold path 706, the first step is to obtain a connection to the underlying database from the connection pool 236 and start a transaction on this connection as shown with block 710. This is done by requesting this service from the database connection management service 234. Using this connection, a request can be made to the underlying database to set an exclusive lock on the record to be made available for update to retrieve the data of this record. The update lock is set and the record data received in block 712. Also, before returning the data of this record to the decision application, the decision base file manager 228 saves a version number (version#) locally as indicated in block 714.

Keeping update version numbers associated with all durable records allows them to be accessed using either exclusive (held) or optimistic locking. Shaded block 716 represents the decision application (after it has received back control) performing its processing in the body of the File Access Block. Block 718 shows a close FAB operation ending this FAB body where control returns to the decision base file manager 228. Block 720 represents decision base file manager 228 updating its local copy of the update version number since a new update is about to be applied.

The decision base file manager 228, in block 722, applies this update of the record data and the associated update version number into the durable record data in the underlying database 216. This operation depends on the fact that a connection to the underlying database was held since the operation in block 710 and an exclusive lock held using this connection on the underlying database record. The ACID transaction to the underlying database 216 is committed completing the durable data update and the associated connection is released, as shown in block 724. Control then flows to block 726 where the outcome is reported back to the decision application and the processing of a FAB through this path is complete.

With respect to the update with optimistic lock path 708, decision box 728 determines whether a local copy of the requested record has already been saved in the decision base file manager 228. If this determination is positive then this local version of requested record is retrieved, as shown in block 730, along with its record version number. If the record is not available (the determination is negative) then a connection is obtained, as shown in block 732, to the underlying database by request to the database connection management service. This connection is used to open an ACID transaction and read the data of the underlying record along with its update version number from the database, as shown in block 734.

Since access is optimistic, the transaction is ended and the database connection is released, as shown in block 736, by another request to the database connection manager. Regardless of whether data has come from the database 216 or a local cached copy, the current update version number is saved locally in the decision context 226 for this FAB in decision base file manager 228, as shown in block 738. The fields of the record are passed to the decision application 220.

Shaded block 740 represents decision application processing in the body of the (update optimistic mode) FAB. The decision application 220, as shown in block 742, closes this FAB and passes control back to the decision base file manager 228. The decision base file manager 228 now determines whether this update can be safely applied to the durable data in the underlying database. The decision base file manager 228, as shown in block 744, obtains a new connection to the database by a request to the database connection management service. The decision base file manager 228, as shown in block 746, reads the record and the current update version number in the shared underlying database with an ACID transaction to the database and an update lock.

The decision base file manager 228, as shown in block 748, checks whether this version number matches the one used by its decision application. If they match, the decision application's update can be applied safely. The decision base file manager 228 increments the update version number and write this and the updated record values from the application into the record in durable shared database, relying on the database exclusive lock obtained in the process of block 746. If the update version numbers do not match, the optimistic lock has failed and no change is made to the durable record in the shared database 216. The close FAB operation reports the failure to the decision application. The ACID transaction to the database, as shown in block 750, is ended. The record lock is released and the connection to the database is dropped using the services of database connection manager 234. Control then flows to block 726 where the block end outcome is reported to the decision application 220 as in the held lock case.

The read only path 709 can also begin with a decision box 752 to determine whether the requested read only records are available within a local decision base file manager cache. Other embodiments of this algorithm can use different levels of local read data caching to support searching the locally cached record using various indexing and cache invalidation techniques. Block 754 represents the case where the requested records can be obtained locally using local searching and indexing services in the decision base file manager 228. The alternate path starting with block 756 represents the case where interaction with the underlying shared database is required. A connection to the database is obtained, as shown in block 756, and an ACID transaction is started using services from database connection management. The capabilities of the underlying database are used to locate and retrieve records matching the search specification in the triggering FAB, as shown in block 758. These records being read in some read only lock mode of the database. The transaction used to read this data is ended, read locks are released, and the connection is returned again using services of the database connection management, as shown in block 760.

The decision base file manager 228 constructs Record identifier lists for data field management to be able to return the results of the open FAB operation to the requesting Decision application 220, as shown in block 762. Shaded block 764 represents the process of the decision application 220 within the body of the FAB block. The decision application 220 ends the FAB and control returns to the decision base file manager 228, as shown in block 766. Local resources associated with the FAB such as the record identifier lists to enable iteration through matching record are discarded, as shown in block 768. Control then flows to block 736 where the FAB block end outcome is reported to the decision application 220 as for the other lock mode paths.

The algorithm of FIG. 7 made frequent reference to use of services from database connection manager 234. This component manages a pool of connections 236 to the underlying database to allow efficient use of these connections. The database connection manager 234 keeps track of which connections are currently in use by some FAB on behalf of some decision application 220. A distinguishing characteristic of the decision base system 114 is that a single decision application instance 220 typically holds open multiple nested FABs. This allows a single decision application instance 220 to hold multiple connections to the underlying database 216 concurrently with multiple concurrent ACID transactions to the underlying database 216 using nested FABs. The decision base system 114 operations discussed above showed how this is accomplished, but at the same time, the applications 220 are given the choice to use optimistic or read only access modes in their use of FABs and exploit this to keep database connection times short. These operations enable a high rate of durable file accesses to be achieved while using a relatively small pool of database connections.

Figure 8:
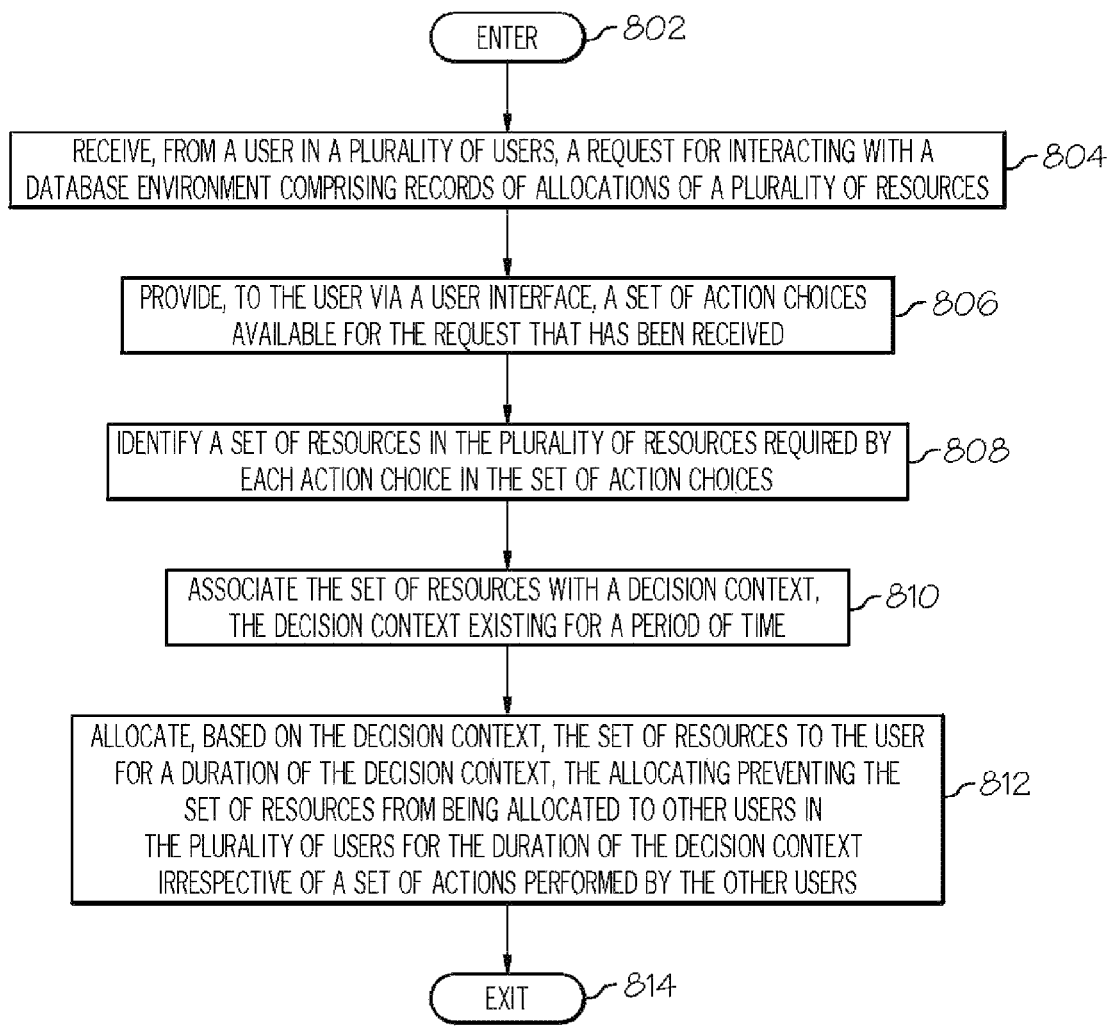
FIG. 8 is an operational flow diagram illustrating one example of managing multiple requests for database resources in a multi-user environment according to one embodiment of the present invention.

FIG. 8 is an operational flow diagram illustrating one example of managing multiple requests for database resources in a multi-user environment. The operational flow diagram begins at step 802 and flows directly to step 804.

The decision base system 114, at step 804, receives from a user 202 in a plurality of users, a request for interacting with a database environment 216 recording in its shared underlying durable data 218 allocations of a plurality of resources. The database environment 216 is shared between the plurality of users. The decision base system 114, at step 806, provides to the user 202 via a user interface 110 a set of action choices 306 available for the request that has been received. The decision base system 114, at step 808 identifies a set of resources in the plurality of resources required by each action choice in the set of action choices 306. The decision base system 114, at step 810 associates the set of resources with a decision context 226, the decision context existing for a defined duration of time. The decision base system 114, at step 812, allocates, based on the decision context 226, the set of resources to the user 202 for the defined duration of the decision context 226. The allocation preventing the set of resources from being allocated to other users in the plurality of users for the duration of the decision context 226 irrespective of a set of actions performed by the other users. The control flow then exits at step 814.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing multiple requests to allocate real world resources in a multi-user environment, the method comprising:

operating a multi-user database environment for access via user systems each with a software application, the database environment including a set of database records representing limited resources to share among the user systems;

receiving a request from the software application to establish a file access block (FAB) for accessing and locking a database record in the set of database records, the request including open FAB input parameters of
an identifier of the database record in the set of database records,
a search specification using one of a database record identifier or an index value with the set of database records, and a lock mode to access the database record in the set of database records, the lock mode includes one of:
update a single database record with an exclusive lock,
update the single database record with an optimistic lock, and
read access to one or more database records; and
opening the FAB using the FAB input parameters and locking the database records in the set of database records for a given amount of time based on the lock mode;
opening another FAB, allowing the software application concurrent access to multiple database records, wherein the software application holds open multiple FABs in a nested structure, wherein the another FAB includes lock mode access that is different than the lock mode access of the FAB, thereby resulting in two nested FABs with different lock modes and lock holding times;
avoiding deadlock by ensuring that inner FABs only lock database records representing resources later in time in a resource ordering scheme than any other current locks held by the software application; and
releasing locks independently on each database record accessed by the software application, without waiting for other outer FAB data accesses to complete, such that when control exits from a FAB, record locks associated with that FAB are immediately released.

2. A system for managing multiple requests to allocate real world resources in a multi-user environment, the system comprising:
a processor;
a memory communicatively coupled to the processor;
a decision base system communicatively coupled to the processor and the memory, wherein the decision base system is configured to perform a method comprising:
operating a multi-user database environment for access via user systems each with a software application, the database environment including a set of database records representing limited resources to share among the user systems;
receiving a request from the software application to establish a file access block (FAB) for accessing and locking a database record in the set of database records, the request including open FAB input parameters of
an identifier of the database record in the set of database records,
a search specification using one of a database record identifier or an index value within the set of database records, and
a lock mode to access the database record in the set of database records, the lock mode includes one of:
update a single database record with an exclusive lock,
update the single database record with an optimistic lock, and
read access to one or more database records; and
opening the FAB using the FAB input parameters and locking the database records in the set of database records for a given amount of time based on the lock mode;
opening another FAB, allowing the software application concurrent access to multiple database records, wherein the open multiple FABs are opened in a nested structure, wherein the another FAB includes lock mode access that is different than the lock mode access of the FAB, thereby resulting in two nested FABs with different lock modes and lock holding times;
avoiding deadlock by ensuring that inner FABs only lock database records representing resources later in time in a resource ordering scheme than any other current locks held by the software application; and
releasing locks independently on each database record accessed by the software application, without waiting for other outer FAB data accesses to complete, such that when control exits from a FAB, record locks associated with that FAB are immediately released.

3. A computer program product for managing multiple requests to allocate real world resources in a multi-user environment, the computer program product comprising:
a non-transitory storage medium readable by a processing circuit and storing instructions for execution by the processing circuit is configured to perform a method comprising:
operating a multi-user database environment for access via user systems each with a software application, the database environment including a set of database records representing limited resources to share among the user systems;
receiving a request from the software application to establish a file access block (FAB) for accessing and locking a database record in the set of database records, the request including open FAB input parameters of
an identifier of the database record in the set of database records,
a search specification using one of a database record identifier or an index value within the set of database records, and
a lock mode to access the database record in the set of database records, the lock mode includes one of:
update a single database record with an exclusive lock,
update the single database record with an optimistic lock, and
read access to one or more database records; and
opening the FAB using the FAB input parameters and locking the database records in the set of database records for a given amount of time based on the lock mode;
opening another FAB, allowing the software application concurrent access to multiple database records, wherein the open multiple FABs are opened in a nested structure, wherein the another FAB includes lock mode access that is different than the lock mode access of the FAB, thereby resulting in two nested FABs with different lock modes and lock holding times;
avoiding deadlock by ensuring that inner FABs only lock database records representing resources later in time in a resource ordering scheme than any other current locks held by the software application; and
releasing locks independently on each database record accessed by the software application, without waiting for other outer FAB data accesses to complete, such that when control exits from a FAB, record locks associated with that FAB are immediately released.

4. The method of claim 1, wherein one of the two nested FABs includes optimistic locking and the other of the two nested FABs includes pessimistic locking.

5. The system of claim 2, wherein one of the two nested FABs includes optimistic locking and the other of the two nested FABs includes pessimistic locking.

6. The computer program product of claim 3, wherein one of the two nested FABs includes optimistic locking and the other of the two nested FABs includes pessimistic locking.

\* \* \* \* \*